United States Patent [19]

Fukuhara et al.

[11] Patent Number: 4,609,633

[45] Date of Patent: Sep. 2, 1986

[54] SILICON NITRIDE SINTERED BODY AND METHOD FOR PREPARING THE SAME

[75] Inventors: Mikio Fukuhara, Yokohama; Yoshitaka Maekawa, Sagamihara, both of Japan

[73] Assignee: Toshiba Tungaloy Co., Ltd., Kawasaki, Japan

[21] Appl. No.: 602,555

[22] Filed: Apr. 20, 1984

[30] Foreign Application Priority Data

Apr. 22, 1983 [JP] Japan ................................. 58-71299
May 10, 1983 [JP] Japan ................................. 58-81334
May 19, 1983 [JP] Japan ................................. 58-88060

[51] Int. Cl.$^4$ ............................................. C04B 35/58
[52] U.S. Cl. ........................................ 501/97; 51/307; 264/65; 501/98; 501/152
[58] Field of Search ............... 501/98, 97, 96; 264/65, 264/332; 51/307

[56] References Cited

U.S. PATENT DOCUMENTS

| | | | |
|---|---|---|---|
| 3,959,446 | 5/1976 | Mazdiyasni et al. | 423/344 |
| 3,969,125 | 7/1976 | Komeya et al. | 501/98 |
| 4,073,845 | 2/1978 | Buljan et al. | 501/97 |
| 4,113,830 | 9/1978 | Mazdiyasni et al. | 501/97 |
| 4,127,416 | 11/1978 | Lumby et al. | 501/98 |
| 4,147,759 | 4/1979 | Demit | 264/65 |
| 4,323,323 | 4/1982 | Lumby et al. | 501/98 |
| 4,506,020 | 3/1985 | Butler et al. | 501/97 |
| 4,547,470 | 10/1985 | Tanase et al. | 501/98 |
| 4,557,244 | 12/1985 | Allor | 501/97 |
| 4,563,433 | 1/1986 | Yeckley et al. | 501/97 |

OTHER PUBLICATIONS

Jack, K. H. "Review: Sialons and Related Nitrogen Ceramics", J. Materials Science, 11(1976), pp. 1135-1158.

Fukuhara, M., Communications of the American Ceramic Society (Sep. 1985), pp. C-226—C-228, "Effect of Nitrogen on the α/B Phase Conversion in Silicon Nitride".

Fukuhara, M., The $\beta/d$ Stress-Induced Transformation in Silicon Nitride Based Ceramic, (Toshiba Tungaloy).

Fukuhara, M. et al., Physical Properties and Cutting Performance of Silicon Nitride Ceramic Wear, 102 (1984), 195-210 (Toshiba Tungaloy).

Huang, Z. et al., Communications of the American Ceramic Society, pp. C-96—C-97, Jun. 1983, "Formation of $\alpha$-Si$_3$N$_4$ Solid Solutions in the System Si$_3$N$_4$-Al-N-Y$_2$O$_3$".

Giachello, A. et al., Ceramic Bulletin, 50(12) 1980, pp. 1212-1215, "Sintering and Properties of Silicon Nitride Containing Y$_2$O$_3$ and MgO".

Babini, G. N. et al., Journal of Materials Science, 18 (1983), pp. 231-244, "Oxidation of Silicon Nitride Hot-Pressed with Y$_2$O$_3$ and MgO".

*Primary Examiner*—Helen M. McCarthy
*Attorney, Agent, or Firm*—Schwartz, Jeffery, Schwaab, Mack, Blumenthal & Evans

[57] ABSTRACT

There is disclosed a silicon nitride body consisting essentially of (A) 0.5 to 25% by weight of at least one of oxides, nitrides and oxynitrides of rare earth elements consisting of Sc, Y and lanthanide elements;

(B) 0.5 to 25% by weight of at least one of the nitrides and oxynitrides of elements consisting of Be, Mg, Ca, Sr, Ba and Ra in group IIa and/or of nitrides and oxynitrides of elements consisting of B, Al, Ga, In and Tl in group IIIb of the periodic table; and (C) a remainder including Si$_3$N$_4$ and inevitable impurities.

The silicon nitride sintered body of this invention has excellent wear resistance and toughness, and is suitable for an industrial production of materials for heat resistant structures.

6 Claims, No Drawings

SILICON NITRIDE SINTERED BODY AND METHOD FOR PREPARING THE SAME

BACKGROUND OF THE INVENTION

This invention relates to a high-strength silicon nitride sintered body suitable for heat resistant structural materials, machine tool materials especially cutting tool materials, wear resistant materials and corrosion resistant materials, and to a method for preparing the sintered body.

A silicon nitride compound has a strong covalent bond, decomposes and evaporates at a high temperature, is poor in a reactivity because of a small self diffusion coefficient of its constituent atoms, and has a greater ratio of a surface energy to a grain boundary energy, as compared with an ionic crystal and a metallic crystal, therefore the compound above is very difficult to sinter. When the silicon nitride is thus sintered in a usual pressureless sintering manner, any dense sintered body cannot be obtained. In order to produce the dense sintered body, a sintering auxiliary such as MgO, $Y_2O_3$, $Al_2O_3$ or AlN is generally used and a pressure sintering or a hot isostatic pressing method (HIP) is utilized under a reaction sintering or a liquid phase sintering.

In the $Si_3N_4$ sintered body including sintering auxiliaries such as MgO, $Y_2O_3$, $Al_2O_3$ or AlN, a lower silicate is formed in grain boundary phases thereof. A liquid phase the lower silicate occur at a low temperature accelerating the sinterability of the $Si_3N_4$. However, it remains in the grain boundary phases even after the sintering process, thereby disadvantageously lowering the strength of the sintered body at a high temperature. For the sake of overcoming such a drawback, a new method has been suggested by which the lower silicate remaining in the grain boundary phases of the $Si_3N_4$ has been crystallized due to thermal treatment. Thereby, the strength of the sintered body increases. The lower silicate or second phases will be relatively uniformly dispersed in the grain boundary phases of the $Si_3N_4$, when the $Si_3N_4$ sintered body is tentatively sintered in a small size. In this case, thus, no serious problem has occurred. However, when a body having a complicated shape or great size is sintered on an industrial scale, the second phases mainly comprising the sintered auxiliary of an oxide will ununiformly be dispersed in the grain boundary phases of the $Si_3N_4$ and a segregation will be brought about, because of a bad reactivity of the $Si_3N_4$ with the sintering auxiliary, and because of the problem of a cooling rate at the time of using a large-scale sintering furnace. As understood from the foregoing, the bad reactivity of the $Si_3N_4$ with the sintering auxiliary and the segregation of the second phases mainly comprising the sintered auxiliary will lead to an increased scattering of properties of the $Si_3N_4$ sintered body and will cause a drop in the strength. Therefore, it is fair to say that an industrialization of such a suggested method is difficult from the viewpoint of technology.

This invention has thus been achieved with the intention of solving the above-mentioned drawbacks and problems, and its object is to provide a silicon nitride sintered body and a method for preparing it by which a reactivity of $Si_3N_4$ with a sintering auxiliary is improved. Second phases uniformly disperse into the sintered body having an intricate shape or a great size, a bonding strength between the second phases and the $Si_3N_4$ will increase and build up many properties such as strength, thermal resistance, wear resistance and toughness of the sintered body.

SUMMARY OF THE INVENTION

A silicon nitride sintered body according to this invention is characterized by comprising:

(A) 0.5 to 25% by weight of at least one of oxides, nitrides and oxynitrides of rare earth elements consisting of Sc, Y and lanthanide elements;

(B) 0.2 to 30% by weight of at least one of oxides, nitrides and oxynitrides of elements consisting of Be, Mg, Ca, Sr, Ba and Ra in group IIa and/or of nitrides and oxynitrides of elements consisting of B, Al, Ga, In and Tl in group IIIb of the periodic table; and (C) a remainder including silicon nitride and inevitable impurities;

provided that the case where a combination of (A) at least one of the oxides of said rare earth element with (B) at least one of the oxides of said elements in group IIa of the periodic table is excluded.

Further, a method for producing silicon nitride sintered bodies according to this invention is characterized by comprising the steps of obtaining a powder compact or a molded product from a mixed powder which is composed of the above-mentioned components; and heating the obtained one at a temperature of 1500° C. to 1900° C. in a nonoxidizing atmosphere.

DESCRIPTION OF THE PREFERRED EMBODIMENTS

Of sintering auxiliaries that contain nitrogen atoms, nitrogen atom-containing compounds of rare earth elements in particular have a lower decomposition temperature and are activated at a lower temperature, as compared with other sintering auxiliaries mainly comprising oxides. Therefore, a reactivity between the sintering auxiliary and $Si_3N_4$ can be increased by using the sintering auxiliary of the nitrogen-containing component. Further, since the reaction between the sintering auxiliary and the $Si_3N_4$ is not limited, the nitrogen-containing sintering auxiliary can be dissolved in the $Si_3N_4$ as a solid solution, though partially, and the sintering auxiliary can thus be uniformly dispersed into grain boundary areas of the $Si_3N_4$ and promotes the sintering operation. The nitrogen component contained in the sintering auxiliary serves to heighten a bonding strength between second phases chiefly comprising the sintering auxiliary and the $Si_3N_4$ rigid phases after a sintering operation, therefore it is possible to prevent disadvantages as a segregation of the sintering auxiliary, a sintering unevenness, residual pores and an abnormal growth of $Si_3N_4$ grains. Furthermore, since an internal stress resulting from a crystalline anisotropy of the second phases and the $Si_3N_4$ is small in the case of using such a sintering auxiliary, a powder compact having a complicated shape or a great size can easily and uniformly be sintered and a dense and high-strength sintered body having a high dimensional accuracy can easily be prepared. Of the sintering auxiliaries used here, a nitride as well as an oxynitride of the rare earth elements surrounds the $Si_3N_4$ grains and uniformly and dispersedly penetrates through the grain boundaries of the $Si_3N_4$, together with a compound of elements in group IIa and/or group IIIb of the periodic table, so that a formation of the second phases mainly comprising the sintering auxiliary and a mutual diffusion between nitrogen atoms in the second phases and nitrogen atoms in the $Si_3N_4$ are promoted in a sintering process. As results, a bonding strength between the $Si_3N_4$ and the second phases are strengthened and the segregation of the second phases is prevented, so that the strength of the sintered body at a high temperature are heightened. Further, the silicon nitride sintered body according to this invention is capable of making a cutting of a heat resistant alloy or a steel material having a high rupture strength by using a sintering auxiliary containing nitrogen element, as compared with a $Si_3N_4$ sintered body in which is used an oxide type sintering auxiliary. Furthermore, oxides, nitrides and oxynitrides of the elements in group IIa and/or nitrides and oxynitrides of the elements in group IIIb of the periodic table which are used as the sintering auxiliaries facilitate the occurrence of liquid phases. And they have a greater effect of promoting the sintering of the $Si_3N_4$ than compounds of the rare earth elements, and the properties of the sintered body are improved by the formation of the uniform second phases mainly comprising the sintering auxiliary and the chemical bonding of the rare earth elements in the second phases with silicon atoms in the $Si_3N_4$ material. The rare earth elements used in this invention include 16 elements of Sc, Y, La, Ce, Pr, Nd, Sm, Eu, Gd, Tb, Dy, Ho, Er, Tm, Yb and Lu, the elements in group IIa of the periodic table include 6 elements of Be, Mg, Ca, Sr, Ba and Ra, and the elements in group IIIb of the periodic table include 5 elements of B, Al, Ga, In and Tl.

As a sintering material for the silicon nitride sintered body according to this invention, the $Si_3N_4$ powder ground as finely as possible is preferred. Moreover, it is preferred that the $Si_3N_4$ powder used as the starting material has a high purity. However, when an amount of Al, Fe and the like contained as impurities in the $Si_3N_4$ powder is 0.5% by weight or less, when oxygen is adsorbed on the surfaces of the $Si_3N_4$ powder grains to form $SiO_2$, or when the blended powder is mixed and ground by $Al_2O_3$ balls, steel balls, hard metal balls or the like in a vessel, even if impurities dissolved out from the vessel and these balls are present in an amount of 5% by weight or less, the high-strength silicon nitride sintered body can produce by adjusting an amount of the sintering auxiliary, an amount of the oxide, the nitride or the oxynitride of the rare earth element used as the sintering auxiliary, and an amount of the oxide and an amount of nitrogen in the nitride or the oxynitride of the element in group IIa of the periodic table. As starting materials of the $Si_3N_4$ used in this invention, there may be used $\alpha$-$Si_3N_4$, $\beta$-$Si_3N_4$, amorphous $Si_3N_4$ or a mixture including these materials having different crystalline structures in an optional ratio. Further, of at least one of the oxides, the nitrides and the oxynitrides of the rare earth elements as the sintering auxiliaries and at least one of the oxides, the nitrides and the oxynitrides of the elements in group IIa and/or at least one of the nitrides and the oxynitrides of the elements in group IIIb of the periodic table, nitrogen-containing compounds may be stoichiometric or substoichiometric compounds. Among them, the nitrogen-containing compounds of the rare earth elements particularly tend to be oxidized in the atmosphere, therefore they are required to be treated in the presence of an inert gas such as a nitrogen gas, but it is preferable to use these compounds which have been converted into complex compounds with the elements in group IIa of the periodic table.

Here, the reason why contents of the components constituting the sintered body are limited as mentioned above will be elucidated.

When a content of at least one of the oxides, nitrides and oxynitrides of the rare earth elements is less than 0.5% by weight, the second phases principally comprising the sintering auxiliary will be poor in strength at a high temperature and the obtained sintered body itself will thus be weakened. When it is more than 25% by weight, an amount of the $Si_3N_4$ will be relatively reduced, and the hardness, the wear resistance and the heat resistance of the sintered body will be lowered. Accordingly, its content is to be within the range of 0.5 to 25% by weight.

Further, when a content of at least one of the oxide, the nitride and the oxynitrides of the elements in group IIa and/or at least one of the nitride and the oxynitrides of the elements in group IIIb of the periodic table is less than 0.2% by weight, it will be weak in an effect of promoting the sintering of the $Si_3N_4$. In contrast, when it is more than 30% by weight, an amount of the $Si_3N_4$ will be relatively reduced, and a lower silicate will tend to be formed in the second phases mainly comprising the sintering auxiliary, with the result that deteriorations in the hardness and the strength of the sintered body will be brought about. Accordingly, its content is to be within the range of 0.2 to 30% by weight.

Preferred embodiments of the silicon nitride sintered bodies according to this invention can be enumerated as follows:

(1) The silicon nitride sintered body comprising 0.5 to 25% by weight of at least one of the oxides of the rare earth elements; 0.1 to 15% by weight of at least one of the oxides of the elements in group IIa of the periodic table; 0.1 to 15% by weight of at least one of the nitrides of the elements in group IIa of the periodic table; and a remainder including the silicon nitride and inevitable impurities.

(2) The silicon nitride sintered body comprising 0.5 to 25% by weight of at least one of the oxides of the rare earth elements; 0.5 to 25% by weight of at least one of the nitrides and the oxynitrides of the elements in group IIa of the periodic table; and a remainder including the silicon nitride and inevitable impurities.

(3) The silicon nitride sintered body comprising 0.5 to 25% by weight of at least one of the nitrides and the oxynitrides of the rare earth elements; 0.5 to 25% by weight of at least one of the oxides, the nitrides and the oxynitrides of the elements in group IIa of the periodic table; and a remainder including the silicon nitride and inevitable impurities.

(4) The silicon nitride sintered body comprising 0.5 to 25% by weight of at least one of the nitrides and the oxynitrides of the rare earth elements; 0.5 to 25% by weight of at least one of the oxides, the nitrides and the oxynitrides of B, Al, Ga, In and Tl; and a remainder including the silicon nitride and inevitable impurities.

The silicon nitride sintered body of the preceding paragraph (1) comprises 0.5 to 25% by weight of at least one of the oxides of the rare earth elements, 0.1 to 15% by weight of at least one of the oxides of the elements in group IIa of the periodic table, 0.1 to 15% by weight of at least one of the nitrides of the elements in group IIa of the periodic table, and a remainder including the silicon nitride and inevitable impurities. And when a weight ratio of the oxide of the group IIa elements to the nitride of the group IIa element is within the range of 1:9 to 9:1, the sintered body will be obtained in which a less segregation of the sintering auxiliary and sintering unevenness will occur and a smaller deviation of the properties will appear between an outer peripheral portion and an inside portion of the sintered body. However, when the weight ratio of the oxide of the group IIa element to the nitride of the group IIa element is particularly within the range of 1:4 to 4:1, the obtained sintered body will be excellent in wear resistance and toughness. In the case that the sintered body is used, for example, as a cutting tool which will be locally subjected to a rigorous thermal shock and which must have sufficient wear and chipping resistance, at least one of the oxides of the rare earth elements is preferably included in an amount of 1 to 10% by weight, and at least one of the oxides of the elements in group IIa and at least one of the nitrides of the elements in group IIa of the periodic table are preferably included respectively in an amount of 1 to 8% by weight in the body.

When a content of at least one of the oxides of the elements in group IIa of the periodic table is less than 0.1% by weight, an effect of promoting the sintering of the $Si_3N_4$ will be insufficient. In contrast, when it is more than 15% by weight, the lower silicate will remain in the grain boundary phases of the $Si_3N_4$, with the result that the hardness and the strength of the sintered body will drop at times.

When a content of at least one of the nitrides of the elements in group IIa of the periodic table is less than 0.1% by weight, a partial pressure of nitrogen will be low in the sintering process and a dispersion of the second phases mainly comprising the sintering auxiliary will be bad, which fact will bring about the aforesaid segregation. When it is more than 15% by weight, the lower silicate, together with the oxide of the element in group IIa of the periodic table, will remain in the grain boundary phases of the $Si_3N_4$, with the result that the hardness and the strength of the sintered body will drop at times.

In the silicon nitride sintered body of this invention, there may be contained one or more of a hydride of elements in groups IV and V of the periodic table in an amount of not more than 5% by weight. By the addition of the hydride of elements in groups IV and V of the periodic table, unevenness of color in the sintered body is decreased and the characteristics in the sintered body becomes uniform so that the quality of the sintered body is improved. Further, in the sintering process, the hydride has a function of removing carbon or oxygen which are adhered to starting materials and facilitating the sintering of the sintered body.

In the silicon nitride sintered body according to this invention, there may be further mixedly contained one or more of a carbide and a nitride of elements in groups IVa, Va and VIa, and an oxide, a nitride, an oxynitride and the like of elements in group Ia of the periodic table.

The carbide, the nitride and the like of the elements in groups IVa, Va and VIa of the periodic table which are dissolved out from hard metal balls or the like used at a mixing and grinding operation contribute to an improvement in the wear resistance of the sintered body according to this invention. Silicon dioxide, aluminum family elements and iron family elements which have been introduced from the vessel and the balls at the mixing and grinding operation of the starting material powder accelerate a mutual diffusion reaction between silicon and nitrogen in the $Si_3N_4$. Particularly, since the $SiO_2$ causes, in an amount of not more than 1.2% by weight, a decomposition temperature inherent in the $Si_3N_4$ to drop, a reaction of the $Si_3N_4$ with the sintering auxiliary will occur even at a lower temperature. It can thus be believed that the $SiO_2$ compound contributes to sinterability and densification. Oxides, nitrides and oxynitrides of Li, Na and K which are elements in group Ia of the periodic table contribute to sinterability and densification, like the oxides, the nitrides and the oxynitrides of the elements in group IIa of the periodic table, and they are then partially decomposed and removed during sintering. Since playing a secondary role for the oxides, the nitrides and the oxynitrides of the elements in group IIa of the periodic table in such a procedure above, the aforesaid compounds of Li, Na and K may be included in such an amount that the properties of the high-strength silicon nitride sintered body according to this invention are not impaired.

In the manufacturing method of the high-strength silicon nitride sintered body according to this invention, 0.5 to 25% by weight of a powder of at least one of the oxides, the nitrides and the oxynitrides of the rare earth elements and 0.2 to 30% by weight of a powder of at least one of the oxides, the nitrides and the oxynitrides of the elements in group IIa and/or at least one of the nitrides and the oxynitrides of the elements in group IIIb of the periodic table may be mixed with the $Si_3N_4$ powder. Further, a composite compound powder may be mixed with the $Si_3N_4$ powder as a starting material, which the composite compound comprises at least one of the oxides, the nitrides and the oxynitrides of the rare earth elements and at least one of the oxides, the nitrides and the oxynitrides of the elements in group IIa and/or at least one of the nitrides and the oxynitrides of the elements in group IIIb of the periodic table. Furthermore, another composite compound powder may be mixed with the $Si_3N_4$ powder as a starting material, which the composite compound comprises at least one of the oxides, the nitrides and the oxynitrides of the rare earth elements, at least one of the oxides, the nitrides and the oxynitrides of the elements in group IIa of the periodic table, and the $Si_3N_4$. Particularly, when the composite compound powder above is used as the starting material, the sintered body will be prevented from being converted into a rod or a needle-like structure having a small aspect ratio. Since the sintered body which is composed of the grains having the small aspect ratio is excellent in a thermal shock resistance, the composite compound powder is preferably used as the starting material in the case that the sintered body will be utilized in the form of a cutting tool which will locally be subjected to a rigorous thermal shock.

In the manufacturing method according to this invention, each starting material has been obtained by mixing or grinding, and then the mixed powder may be packed in mold. Thus, the molded product may be preliminarily sintered at a lower temperature than a sintering temperature. Further, this preliminarily sintered product may be sintered in a non-oxidizing atmosphere or under a vaccum by means of a sintering procedure such as a usual sintering (inclusive of a pressureless sintering), pressure sintering by induction heating and direct current furnace, a gas pressure sintering, a hot pressing or the like. Furthermore, densification of the sintered bodies is promoted using a hot isostatic press. A sintering temperature to be selected is within the range of 1500° to 1900° C., though varying with the used sintering manner and blended components. Such a temperature above permits the sufficiently dense sintered body to be obtained.

Now, this invention will be described in detail in accordance with the following examples.

EXAMPLE 1

In proportions shown in Table 1 below, there were blended powders of $Si_3N_4$ (comprising about 40% of amorphous $Si_3N_4$, $\alpha$-$Si_3N_4$ and $\beta$-$Si_3N_4$) having an average grain diameter of 1 $\mu$m, $Si_3N_4$ (comprising about 95% of $\alpha$-$Si_3N_4$ and $\beta$-$Si_3N_4$) having an average grain diameter of 2 $\mu$m, $Si_3N_4$ (comprising about 70% of $\alpha$-$Si_3N_4$ and $\beta$-$Si_3N_4$) having an average grain diameter of 5 $\mu$m, YN, $Y_2O_3$, $Y_3O_3N$, MgO, $Mg_3N_2$, $Mg_4ON_2$, BN, AlN and $Al_3O_3N$, in order to prepare samples. Each sample was mixed and ground by use of WC-based hard metal balls in a hexane solvent in a stainless steel vessel. A rectangular carbon mold as large as 100 mm ×100 mm which was covered with a BN powder was packed with the obtained mixed powder. An interior in a furnace was replaced with an $N_2$ gas, and then a pressure sintering was carried out at a pressure of 150 to 400 kg/cm$^2$ at a temperature of 1700° to 1900° C. for a holding time of 60 to 120 minutes. Manufacturing conditions for each sample are shown in Table 1. Each of the thus obtained sintered bodies was separated into a central portion and an outer peripheral portion, and each portion was cut approximately 13 ×13 ×5 mm. Properties of each cut sample were inspected by comparing it with Comparative Sample No. 1 (sintered body of 4%$Y_2O_3$-4%MgO-92%$Si_3N_4$ in weight) and Comparative Sample No. 2 (sintered body of 5%$Y_2O_3$-2%$Al_2O_3$-93%$Si_3N_4$ in weight). Results are shown in Table 2 below.

TABLE 1

| Sample No. | Blended components (% by weight) | Sintering conditions Temperature (°C.) | Holding time (min) |
|---|---|---|---|
| 1 | 5% $Y_2O_3$—4.0% MgO—1.0% $Mg_3N_2$—90% $Si_3N_4$(1 $\mu$m) | 1850 | 60 |
| 2 | 8% $Y_2O_3$—2.5% MgO—2.5% $Mg_3N_2$—87% $Si_3N_4$(2 $\mu$m) | 1800 | 90 |
| 3 | 15% $Y_2O_3$—15% MgO—5% $Mg_3N_2$—65% $Si_3N_4$(5 $\mu$m) | 1700 | 90 |
| 4 | 25% $Y_2O_3$—5% MgO—5% $Mg_3N_2$—65% $Si_3N_4$(5 $\mu$m) | 1700 | 90 |
| 5 | 4% $Y_2O_3$—4% $Mg_4ON_2$—92% $Si_3N_4$(1 $\mu$m) | 1850 | 90 |
| 6 | 4% $Y_2O_3$—3% $Mg_3N_2$—3% $Mg_4ON_2$—90% $Si_3N_4$(2 $\mu$m) | 1850 | 90 |
| 7 | 4% YN—4% MgO—92% $Si_3N_4$(1 $\mu$m) | 1800 | 60 |
| 8 | 4% YN—6% $Mg_4ON_2$—90% $Si_3N_4$(1 $\mu$m) | 1800 | 60 |
| 9 | 6% $Y_3O_3N$—4% $Mg_3N_2$—90% $Si_3N_4$(1 $\mu$m) | 1800 | 60 |
| 10 | 8% $Y_3O_3N$—15% MgO—77% $Si_3N_4$(1 $\mu$m) | 1800 1700 | 60 90 |
| 11 | 25% $Y_3O_3N$—8% MgO—67% $Si_3N_4$(2 $\mu$m) | 1700 | 60 |
| 12 | 20% YN—20% $Mg_3N_2$—60% $Si_3N_4$(5 $\mu$m) | 1700 | 60 |
| 13 | 3% $Y_3O_3N$—3% AlN—94% $Si_3N_4$(1 $\mu$m) | 1900 | 120 |
| 14 | 4% YN—3% BN—3% $Al_3O_3N$—90% $Si_3N_4$(1 $\mu$m) | 1850 | 90 |

TABLE 2

| Sample No. and position | Hardness (HRA) | Thermal shock test (°C.) | Klc (MN/m$_{3/2}$) | Sample No. and position | Hardness (HRA) | Thermal shock test (°C.) | Klc (MN/m$_{3/2}$) |
|---|---|---|---|---|---|---|---|
| Central portion of 1 | 93.0 | 580 | 8.36 | Peripheral portion of 1 | 92.9 | 600 | 8.34 |
| Central portion of 2 | 92.7 | 640 | 8.86 | Peripheral portion of 2 | 92.7 | 640 | 8.88 |
| Central portion of 3 | 92.0 | 700 | 9.24 | Peripheral portion of 3 | 92.1 | 720 | 9.25 |
| Central portion of 4 | 91.8 | 700 | 9.28 | Peripheral portion of 4 | 91.9 | 720 | 9.27 |
| Central portion of 5 | 93.3 | 540 | 8.76 | Peripheral portion of 5 | 93.3 | 520 | 8.75 |
| Central portion of 6 | 93.1 | 560 | 8.84 | Peripheral portion of 6 | 93.2 | 540 | 8.86 |
| Central portion of 7 | 93.5 | 560 | 8.83 | Peripheral portion of 7 | 93.5 | 540 | 8.84 |
| Central portion of 8 | 93.2 | 580 | 8.95 | Peripheral portion of 8 | 93.2 | 580 | 8.93 |
| Central portion of 9 | 93.6 | 600 | 9.14 | Peripheral portion of 9 | 93.5 | 600 | 9.15 |
| Central portion of 10 | 92.3 | 740 | 9.52 | Peripheral portion of 10 | 92.2 | 720 | 9.51 |
| Central portion of 11 | 92.5 | 780 | 9.64 | Peripheral portion of 11 | 92.6 | 760 | 9.63 |
| Central portion of 12 | 91.5 | 800 | 9.81 | Peripheral portion of 12 | 91.4 | 780 | 9.82 |
| Central portion of 13 | 94.0 | 520 | 8.57 | Peripheral portion of 13 | 93.9 | 540 | 8.55 |
| Central portion of 14 | 93.5 | 600 | 8.74 | Peripheral portion of 14 | 93.6 | 600 | 8.75 |
| Central portion of Comparative Sample 1 | 92.1 | 540 | 7.16 | Peripheral portion of Comparative Sample 1 | 93.1 | 440 | 6.27 |
| Central portion of Comparative Sample 2 | 92.2 | 380 | 4.97 | Peripheral portion of Comparative Sample 2 | 93.5 | 440 | 6.10 |

It can be confirmed from the results in Table 2 that the silicon nitride sintered body according to this invention has a high rigidity, thermal shock resistance and fracture toughness value (Klc), was smaller in a deviation of properties between the central portion and the outer peripheral portion thereof, as compared with Comparative Sample No. 1 (a $Y_2O_3$—MgO—$Si_3N_4$ sintered body) and Comparative Sample No. 2 (a $Y_2O_3$—$Al_2$—$Si_3N_4$ sintered body), and could be uniformly sintered even if it was of a large size. Each result of the thermal shock tests carried out here is represented with a temperature at which no crack occurred in each sample dipped in water of about 20° C. (room temperature) after 2 minutes' holding at each temperature. Further, each fracture toughness value above was calculated from a length of a crack and a size of an indent which were generated by a Vickers indent of 30 kg load. Furthermore, the respective outer peripheral portions of Sample Nos. 5, 7 and 13 were examined by means of an X-ray diffraction and a X-ray fluorescence analysis, and it was confirmed that Co and W were included therein and the element W was considered to be present in the form of tungsten silicide.

EXAMPLE 2

In proportions shown in Table 3 below, materials were blended which were the $Si_3N_4$ having an average grain diameter of 1 μm which was used in Example 1, $MgSiN_2$, $Y_2Mg_3O_3N_2$, $Y_2O_3$, $YMgON$, $YSiO_2N$, $YMgSi_3ON_5$, $YMg_3N_3$, $Mg_3N_2$, $AlYN_2$, $Al_2YO_3N$, $YAl_2Si_3O_3N_5$, other oxides of rare earth elements and compounds of elements in group IIa of the periodic table. A mixed powder of each sample was prepared in the same procedure as in Example 1. Each mixed powder was then sintered under the same manufacturing conditions as in Example 1, and properties of the resulting sintered body were investigated by the same procedure as in Example 1. Results obtained are shown in Table 4 below.

TABLE 3

| Sample No. | Blended components (% by weight) | Sintering conditions Temperature (°C.) | Holding time (min) |
|---|---|---|---|
| 15 | 5% $Sc_2O_3$—2.5% MgO—2.5% $Mg_3N_2$—90% $Si_3N_4$ | 1850 | 60 |
| 16 | 5% $CeO_2$—2.5% MgO—2.5% $Ca_3N_2$—90% $Si_3N_4$ | 1850 | 60 |
| 17 | 5% $Dy_2O_3$—2% CaO—1% $Mg_3N_2$—92% $Si_3N_4$ | 1850 | 60 |
| 18 | 3% $Y_2O_3$—2% $Sc_2O_3$—1% MgO—2% $Mg_3N_2$—92% $Si_3N_4$ | 1850 | 60 |
| 19 | 8% $Y_2Mg_3O_3N_2$—92% $Si_3N_4$ | 1850 | 120 |
| 20 | 5% $Sc_2O_3$—4% $Mg_3N_2$—91% $Si_3N_4$ | 1850 | 120 |
| 21 | 10% $Eu_2O_3$—2% $Mg_3N_2$—88% $Si_3N_4$ | 1800 | 90 |
| 22 | 4% YN—6% $MgSiN_2$—90% $Si_3N_4$ | 1750 | 90 |
| 23 | 4% $YMgSi_3ON_5$—96% $Si_3N_4$ | 1850 | 90 |
| 24 | 6% $YMg_3N_3$—2% MgO—92% $Si_3N_4$ | 1800 | 90 |
| 25 | 3% YMgON—3% $MgSiN_2$—94% $Si_3N_4$ | 1800 | 120 |
| 26 | 5% $YSiO_2N$—5% AlN—90% $Si_3N_4$ | 1800 | 120 |
| 27 | 8% $AlYN_2$—92% $Si_3N_4$ | 1850 | 90 |
| 28 | 8% $Al_2YO_3N$—92% $Si_3N_4$ | 1850 | 90 |
| 29 | 8% $YAl_2Si_3O_3N_5$—92% $Si_3N_4$ | 1850 | 90 |

TABLE 4

| Sample No. and position | Hardness (HRA) | Thermal shock test (°C.) | Klc ($MN/m_{3/2}$) | Sample No. and position | Hardness (HRA) | Thermal shock test (°C.) | Klc ($MN/m_{3/2}$) |
|---|---|---|---|---|---|---|---|
| Central portion of 15 | 93.0 | 620 | 8.32 | Peripheral portion of 15 | 93.0 | 600 | 8.30 |
| Central portion of 16 | 92.9 | 600 | 8.25 | Peripheral portion of 16 | 93.0 | 580 | 8.23 |
| Central portion of 17 | 93.2 | 620 | 8.36 | Peripheral portion of 17 | 93.1 | 600 | 8.35 |
| Central portion of 18 | 92.9 | 600 | 8.17 | Peripheral portion of 18 | 92.9 | 580 | 8.19 |
| Central portion of 19 | 93.2 | 620 | 8.86 | Peripheral portion of 19 | 93.2 | 600 | 8.85 |
| Central portion of 20 | 93.0 | 580 | 8.97 | Peripheral portion of 20 | 93.0 | 600 | 8.96 |
| Central portion of 21 | 92.5 | 580 | 8.78 | Peripheral portion of 21 | 92.6 | 600 | 8.77 |
| Central portion of 22 | 93.8 | 680 | 8.93 | Peripheral portion of 22 | 93.8 | 700 | 8.95 |
| Central portion of 23 | 94.2 | 700 | 8.96 | Peripheral portion of 23 | 94.1 | 720 | 9.95 |
| Central portion of 24 | 93.6 | 740 | 9.23 | Peripheral portion of 24 | 93.6 | 720 | 9.24 |
| Central portion of 25 | 93.9 | 740 | 9.27 | Peripheral portion of 25 | 93.9 | 760 | 9.28 |
| Central portion of 26 | 93.8 | 640 | 8.73 | Peripheral portion of 26 | 93.9 | 660 | 8.75 |
| Central portion of 27 | 94.1 | 700 | 8.86 | Peripheral portion of 27 | 94.2 | 700 | 8.87 |
| Central portion of 28 | 94.3 | 680 | 9.07 | Peripheral portion of 28 | 94.4 | 700 | 9.08 |
| Central portion of 29 | 94.0 | 700 | 8.95 | Peripheral portion of 29 | 94.1 | 720 | 8.96 |

EXAMPLE 3

The $Si_3N_4$ having an average grain diameter of 1 μm which was used in Example 1, an yttrium compound, a magnesium compound, compounds of elements in groups IIa and IIIb of the periodic table and compounds of rare earth elements were used and blended as in Table 5. A mixed powder of each sample was prepared in the same procedure as in Example 1, and was then sintered under the same manufacturing conditions as in Example 1. Properties of the resulting sintered bodies are shown in Table 6 below. These properties of the sintered bodies were investigated following the same procedure as in Example 1.

using an Ar gas was afterward used. Properties of the resulting sintered bodies are shown in Table 8 below. These properties of the sintered bodies were examined following the same procedure as in Example 1

TABLE 7

| Sample No. | Blended components (% by weight) | Sintering conditions Sintering temperature (°C.) | HIP treatment | Holding time (min) |
|---|---|---|---|---|
| 34 | 4%YN$_{0.85}$—2%MgO—94%Si$_3$N$_4$ | 1550, N$_2$ pressure | 1600° C.-1500 bar | 60 |
| 35 | 4%Y$_3$(O$_3$N)$_{0.95}$—2%Mg$_3$(N$_2$)$_{0.90}$—94%Si$_3$N$_4$ | 1850, N$_2$ pressure | none | 90 |
| 36 | 6%YN$_{0.85}$—6%Mg$_3$(N$_2$)$_{0.90}$—88%Si$_3$N$_4$ | 1550, N$_2$ pressure | 1600° C.-1500 bar | 60 |
| 37 | 4%Y$_3$(O$_3$N)$_{0.95}$—2%AlN$_{0.90}$—94%Si$_3$N$_4$ | 1850, N$_2$-200 Torr | none | 90 |
| 38 | 2%Y$_3$(O$_3$N)$_{0.95}$—2%AlN$_{0.90}$—2%BN—94%Si$_3$N$_4$ | 1850, N$_2$-1 atm | none | 90 |

TABLE 8

| Sample No. and position | Hardness (HRA) | Thermal shock test (°C.) | KIc (MN/m$_{3/2}$) | Sample No. and position | Hardness (HRA) | Thermal shock test (°C.) | KIc (MN/m$_{3/2}$) |
|---|---|---|---|---|---|---|---|
| Central portion of 34 | 93.5 | 620 | 9.31 | Peripheral portion of 34 | 93.6 | 620 | 9.33 |
| Central portion of 35 | 93.6 | 640 | 9.42 | Peripheral portion of 35 | 93.5 | 620 | 9.40 |
| Central portion of 36 | 93.2 | 660 | 9.19 | Peripheral portion of 36 | 93.3 | 660 | 9.20 |
| Central portion of 37 | 94.2 | 660 | 8.23 | Peripheral portion of 37 | 94.1 | 660 | 8.24 |
| Central portion of 38 | 94.3 | 620 | 8.15 | Peripheral portion of 38 | 94.4 | 640 | 8.16 |

TABLE 5

| Sample No. | Blended components (% by weight) | Sintering conditions Temperature (°C.) | Holding time (min) |
|---|---|---|---|
| 30 | 2% YN—2% ScN—4% CaO—92% Si$_3$N$_4$ | 1850 | 120 |
| 31 | 4% NdN—4% MgSiN$_2$—92% Si$_3$N$_4$ | 1850 | 90 |
| 32 | 4% ScN—4% YMgON—92% Si$_3$N$_4$ | 1850 | 90 |
| 33 | 4% TbN—4% AlN—92% Si$_3$N$_4$ | 1850 | 120 |

TABLE 6

| Sample No. and position | Hardness (HRA) | Thermal shock test (°C.) | KIc (MN/m$_{3/2}$) | Sample No. and position | Hardness (HRA) | Thermal shock test (°C.) | KIc (MN/m$_{3/2}$) |
|---|---|---|---|---|---|---|---|
| Central portion of 30 | 93.4 | 580 | 9.21 | Peripheral portion of 30 | 93.4 | 580 | 9.20 |
| Central portion of 31 | 93.1 | 600 | 9.35 | Peripheral portion of 31 | 93.2 | 580 | 9.35 |
| Central portion of 32 | 93.5 | 640 | 9.37 | Peripheral portion of 32 | 93.5 | 620 | 9.36 |
| Central portion of 33 | 93.5 | 640 | 8.38 | Peripheral portion of 33 | 93.5 | 640 | 8.39 |

EXAMPLE 4

The Si$_3$N$_4$ having an average grain diameter of 1 μm which was used in Example 1, YN$_{0.85}$, Y$_3$(O$_3$N)$_{0.95}$, Mg$_3$(N$_2$)$_{0.90}$ and AlN$_{0.90}$ which were substoichiometric compounds, MgO and Al$_2$O$_3$ were used and blended as in Table 7. A mixed powder of each sample was prepared in the same procedure as in Example 1, and was then sintered under the same manufacturing conditions as in Example 1 with the exception that a pressure sintering of using an N$_2$ gas of about 10 kg/cm$^2$ was utilized, alternatively in addition to it, an HIP treatment of

EXAMPLE 5

For the sintered bodies according to this invention, i.e. Sample Nos. 1, 5 to 7 and 13 in Example 1, Sample Nos. 15, 17, 20 and 28 in Example 2, Sample No. 37 in Example 4, as well as Comparative Sample No. 1 (sintered body of 4%Y$_2$O$_3$-4%MgO-92%Si$_3$N$_4$ in weight) and Comparative sample 2 (sintered body of 5%Y$_2$O$_3$-2%Al$_2$O$_3$-93%Si$_3$N$_4$ in weight) which were sintered in the same procedure as in Example 1, cutting tests were carried out by separating each sample into a central portion and an outer peripheral portion, polishing them in accordance with SNP432 and SNCN54ZTN of JIS Standard, and cutting them under the following conditions (A), (B), (C) and (D). Results obtained are shown in Table 9 below.

(A) Conditions of the cutting tests by turning:
  Work material: FC35 (350 φmm ×1500 mm)
  Cutting speed: 600 m/min
  Depth of cut: 1.5 mm
  Feed rate: 0.7 mm/rev
  Cutting time: 30 min
  Tool geometry: SNP432

(B) Conditions of the cutting tests by milling:

Work material: Case hardening steel (HRc45) with black skin
Cutting speed: 270 m/min
Depth of cut: 4.5 mm
Feed rate of a table: 600 mm/min
Feed rate per blade: 0.20 mm/rev
Tool geometry: SNCN54ZTN
Cutting time: 30 min Tool geometry: Round shape of RNMN43
(D) Conditions of the cutting tests by milling:
Work material: Curbrizing material (HRc55) of SCM3
Cutting speed: 200 m/min
Depth of cut: 0.25 mm
Feed rate per blade: 0.15 mm/rev
Cutting time: 10 min.

TABLE 9

| Sample No. and position | (A) Cutting conditions Average flank wear ($V_B$ mm) | (B) Cutting conditions Damage state | (C) Cutting conditions Average flank wear ($V_B$ mm) | (D) Cutting conditions Damage state |
| --- | --- | --- | --- | --- |
| Central portion of 1 | 0.15 | Normal wear | 0.11 | Normal wear |
| Central portion of 5 | 0.14 | " | 0.10 | " |
| Central portion of 6 | 0.15 | " | 0.09 | " |
| Central portion of 7 | 0.12 | " | 0.11 | Minute chipping at tip of blade |
| Central portion of 13 | 0.11 | " | 0.09 | Minute chipping at tip of blade |
| Central portion of 15 | 0.14 | " | 0.10 | Minute chipping at tip of blade |
| Central portion of 17 | 0.15 | " | 0.12 | Minute chipping at tip of blade |
| Central portion of 20 | 0.13 | " | 0.13 | Minute chipping at tip of blade |
| Central portion of 28 | 0.14 | " | 0.11 | Minute chipping at tip of blade |
| Central portion of 37 | 0.12 | " | 0.12 | Minute chipping at tip of blade |
| Peripheral portion of 1 | 0.14 | " | 0.10 | Normal wear |
| Peripheral portion of 5 | 0.13 | " | 0.11 | " |
| Peripheral portion of 6 | 0.16 | " | 0.10 | " |
| Peripheral portion of 7 | 0.13 | " | 0.12 | Minute chipping at tip of blade |
| Peripheral portion of 13 | 0.10 | " | 0.10 | Minute chipping at tip of blade |
| Peripheral portion of 15 | 0.15 | " | 0.11 | Minute chipping at tip of blade |
| Peripheral portion of 17 | 0.16 | " | 0.12 | Minute chipping at tip of blade |
| Peripheral portion of 20 | 0.14 | " | 0.11 | Minute chipping at tip of blade |
| Peripheral portion of 28 | 0.13 | " | 0.12 | Minute chipping at tip of blade |
| Peripheral portion of 37 | 0.11 | " | 0.13 | Minute chipping at tip of blade |
| Central portion of Comparative Sample 1 | 0.35 | Cutting lifetime of chipping was 10 min. | Cutting lifetime was 18 sec. | Lack at tip of blade for 1 min 5 sec. |
| Central portion of Comparative Sample 2 | 0.30 | Cutting lifetime of chipping was 20 min. | Cutting lifetime was 15 sec. | Lack at tip of blade for 1 min 33 sec. |
| Peripheral portion of Comparative Sample 1 | 0.18 | Normal wear | Cutting lifetime was 10 sec. | Lack at tip of blade for 23 sec. |
| Peripheral portion of Comparative Sample 2 | Cutting lifetime was 20 min. | Cutting lifetime of chipping was 10 min. | Cutting lifetime was 5 sec. | Lack at tip of blade for 12 sec. |

(C) Conditions of the cutting tests by turning:
Work material:
Ni-base supper alloy
Waspalloy (HRc42)
(Ni-19.4%Cr-13.6%Co-4.4%Mo-3.1%Ti-1.5%Al-0.6%Fe)
Cutting speed: 150 m/min
Depth of cut: 0.5 mm
Feed rate: 0.1 mm/rev
Cutting fluid: Wet (Wl-3)
Cutting time: 2 min As understood from the results in Table 9, the high-strength silicon nitride sintered bodies according to this invention have more excellent wear resistance in turning and chipping resistance in milling cutting than the $Y_2O_3$—MgO—$Si_3N_4$ sintered body and the $Y_2O_3$—$Al_2O_3$—$Si_3N_4$ sintered body which are the Comparative Sample. Further, even when sintered in a great size, each sintered body according to this invention had scarcely any differences of a cutting performance and other properties between its central and outer peripheral portions, and it is very stable also in quality. Furthermore, according to the results of Sample No. 4, the sintered bodies in which a ratio of MgO to $Mg_3N_2$ is within the range of 1:4 to 4:1 are generally excellent in both of the wear resistance and the toughness.

It can be estimated from the above-mentioned results that the silicon nitride bodies according to this invention are suitable for an industrial production of heat resistant materials often having large sizes and complicated shapes as well as materials for machining tools used to manufacture many articles.

We claim:

1. A silicon nitride sintered body consisting essentially of:
    (A) 0.5 to 25% by weight of at least one from the group consisting of a nitride and an oxynitride of a rare earth element selected from the group consisting of scandium, yttrium and lanthanide elements;
    (B) 0.5 to 25% by weight of at least oen nitride of an element selected from the group consisting of beryllium, magnesium, calcium, strontium, barium and radium and/or at least one nitride of an element selected from the group consisting of boron, aluminum, gallium, indium and thallium; and
    (C) silicon nitride.

2. The silicon nitride sintered body according to claim 1, wherein said component (B) is at least one nitride of an element from the group consisting of B, Al, Ga, In and Tl.

3. The silicon nitride sintered body according to claim 1, wherein said component (B) is at least one nitride of an element from the group consisting of Be, Mg, Ca, Sr, Ba and Ra.

4. A silicon nitride sintered body according to claim 1, consisting of said components (A) and (C) and 0.5 to 25% by weight of at least one nitride of an element from the group of B, Al, Ga, In and Tl.

5. A silicon nitride sintered body according to claim 1, consisting of said components (A) and (C) and 0.5 to 25% by weight of at least one nitride of an element from the group of Be, Mg, Ca, Sr, Ba and Ra.

6. A method for preparing a silicon nitride sintered body, which comprises the steps of:
    (A) obtaining a powder compact or a molded product from a mixed powder consisting essentially
        (i) 0.5 to 25% by weight of at least one from the group consisting of a nitride and an oxynitride of a rare earth element selected from the group consisting of scandium, yttrium and lanthanide elements,
        (ii) 0.5 to 25% by weight of at least one nitride or an element selected from the group consisting of beryllium, magnesium, calcium, storntium, barium and radium and/or at least one nitride of an element selected from the group consisting of boron, aluminum, gallium, indium and thallium, and
        (iii) silicon nitride; and
    (B) thermally sintering said powder compact or said molded product at a temperature of 1500° or 1900° C. in a non-oxidizing atmosphere.

* * * * *